United States Patent
Klos et al.

(10) Patent No.: US 9,400,229 B2
(45) Date of Patent: Jul. 26, 2016

(54) APPARATUS AND METHOD FOR MONITORING THE STATE OF A ROLLER BEARING

(71) Applicant: SIEMENS AKTIENGESELLSCHAFT, Munich (DE)

(72) Inventors: Hans-Henning Klos, Nuremberg (DE); Klaus-Dieter Müller, Nuremberg (DE); Ulrich Werner, Bubenreuth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 394 days.

(21) Appl. No.: 14/024,903

(22) Filed: Sep. 12, 2013

(65) Prior Publication Data
US 2014/0123760 A1    May 8, 2014

(30) Foreign Application Priority Data

Nov. 7, 2012 (DE) .......................... 10 2012 220 222

(51) Int. Cl.
*G01M 13/04* (2006.01)
*F16C 19/52* (2006.01)

(52) U.S. Cl.
CPC ............. *G01M 13/045* (2013.01); *F16C 19/52* (2013.01)

(58) Field of Classification Search
CPC .............................. G01M 13/045; F16C 19/52
USPC .................... 73/593, 660; 340/682
See application file for complete search history.

(56) References Cited

U.S. PATENT DOCUMENTS

| 4,615,216 A | 10/1986 | Vykoupil |
| 5,811,683 A * | 9/1998 | Yoshioka ............ G01M 13/045 324/207.25 |
| 6,205,872 B1 * | 3/2001 | Pflueg ................... G01H 11/08 73/593 |
| 7,559,239 B2 | 7/2009 | Ens et al. |

FOREIGN PATENT DOCUMENTS

| DE | 19963608 A1 | 7/2000 |
| DE | 19963808 A1 | 7/2000 |
| DE | 10100444 A1 | 7/2002 |
| DE | 10325801 A1 | 1/2005 |
| WO | WO 02073150 A2 | 9/2002 |

OTHER PUBLICATIONS

Klein Ulrich; "Schwingungsdiagnostische Beurteilung von Maschinen und Anlagen"; 2. Auflage; Düsseldorf: Stahleisen GmbH; pp. 5-15; 76-88; ISBN 3-514-00663-6; 2000; DE.

* cited by examiner

*Primary Examiner* — John Chapman, Jr.

(74) *Attorney, Agent, or Firm* — Harness, Dickey & Pierce, P.L.C.

(57) ABSTRACT

A method and an apparatus are disclosed for monitoring the state of a roller bearing. The apparatus includes a vibration sensor, configured to detect vibrations which occur during operation of the bearing, and to generate a first signal as a function of the detected vibrations. A diagnosis electronics system is configured to output an item of information about a state of the bearing on the basis of the first signal and at least one limit value stored in the diagnosis electronics system. A sound emission sensor is provided, configured to pick up noises, produced in the event of plastic deformation of the bearing at least in regions. A second signal is then transmitted to the diagnosis electronics system, taking into account the picked-up noises.

11 Claims, 2 Drawing Sheets

APPARATUS AND METHOD FOR MONITORING THE STATE OF A ROLLER BEARING

PRIORITY STATEMENT

The present application hereby claims priority under 35 U.S.C. §119 to German patent application number DE 102012220222.6 filed Nov. 7, 2012, the entire contents of which are hereby incorporated herein by reference.

FIELD

At least one embodiment of the invention generally relates to an apparatus for monitoring the state of a roller bearing.

BACKGROUND

During operation of machines and installations, it is highly important to select the optimum time for carrying out servicing operations. If intervention is made too early, unnecessary costs arise due to the premature replacement of components. If, in contrast, intervention is made too late, there is a risk of a component failing, and this may sometimes lead to failure of an entire installation. The bearings of a machine are primarily parts which are subject to wear and have to be regularly serviced and, respectively, replaced when wear occurs. Defective bearings often result in severe consequential damage. Different sensor systems are known for determining the optimum time at which a bearing, in particular a roller bearing, has to be replaced, it being possible for wear phenomena and/or damage to the bearing to be detected by said sensor systems.

In this connection, it is known to monitor a state using integrated vibration analysis in order to allow an alert to be issued at a precise time and in a robust manner and therefore to allow dangerous operating states to be identified in good time and to allow corresponding countermeasures to be initiated. In many cases, bearings are monitored for damaging frequencies in the frequency range of from 2 Hz to 10 kHz in the linear frequency range of a sensor by means of FFT analysis and input of mechanical properties, in particular taking into account the geometry of the roller bearing, and also of the rotation speed. Another technical solution makes provision for intermittent vibrations which are caused by damaging patterns, so-called shock pulses, to be analyzed using a resonant vibration pick-up in the ultrasound range. Both of the abovementioned methods are suitable for ascertaining the actual state of a bearing. In order to visualize the state of a bearing, auxiliary means which indicate whether a bearing is still intact or has already been damaged are known in this connection.

SUMMARY

Therefore, a decision as to whether an installation can continue to operate or has to be decommissioned is made as a function of the detected state of the bearing. However, the inventors have recognized that these technical solutions exhibit the problem that only the actual state of a bearing is taken into consideration.

However, they have further recognized that it is only possible to obtain information about the state of a bearing and/or to carry out measurements which permit a statement to be made about how long a bearing can continue to operate without problems to a limited extent, for example in preparation for possibly turning off an installation.

At least one embodiment of the invention is directed to developing monitoring of a bearing, in particular of a roller bearing, in such a way that preventative statements about future necessary servicing or replacement of a bearing can be made with a high degree of reliability. In this case, it should be ensured, in particular, that servicing is not performed either too early or too late, in order to allow an installation to be operated in as economical a manner as possible. Furthermore, it should be possible to implement the method which is to be specified using known sensor technology and to retrofit it even in the case of existing installations using relatively simple devices.

An apparatus and a method are disclosed. Advantageous embodiments of the invention are the subject matter of the dependent claims and will be explained in greater detail in the following description with partial reference to the figures.

An embodiment of the invention is based on an apparatus for monitoring the state of a roller bearing which has a vibration sensor, it being possible to detect vibrations which occur during operation of the bearing using said vibration sensor and it being possible to generate a first signal as a function of the detected vibrations. A diagnosis electronics system is also provided, it being possible for said diagnosis electronics system to output an item of information about a state of the bearing on the basis of the first signal, which is generated by the vibration sensor, and of at least one limit value, which is stored in the diagnosis electronics system.

According to an embodiment of the invention, an apparatus of this kind for monitoring the state of a roller bearing has been developed in such a way that, in addition to the vibration sensor, a sound emission sensor is provided, it being possible for noises which are produced in the event of plastic deformation of the bearing at least in regions to be picked up by the sound emission sensor, and that a second signal can be transmitted to the diagnosis electronics system taking into account the picked-up noises. In this connection, provision is made in a particularly preferred manner for the diagnosis electronics system to be designed in such a way that the stored limit values can be changed taking into account the received second signal and therefore an item of information about the state of the bearing is output as a function of the noises which are produced by the bearing and picked up by the sound emission sensor.

In addition to the described apparatus, the invention relates to a method. The method according to an embodiment of the invention is distinguished in that, in addition to monitoring vibrations, noises which are produced in the event of plastic deformation of the bearing at least in regions are picked up by a sound emission sensor, and in that a second signal is generated and transmitted to the diagnosis electronics system taking into account the picked-up noises.

The received second signals are preferably classified in accordance with their amplitude and/or their occurrence per time interval in the diagnosis electronics system, and at least one characteristic value is ascertained on the basis of the classification. The characteristic value is preferably used in order to match the vibration limit values which are stored in the diagnosis electronics system to the occurrence, the intensity and/or the frequency of the noises which are picked up by the sound emission sensor.

BRIEF DESCRIPTION OF THE DRAWINGS

In the text which follows, the invention will be explained in greater detail, without restricting the general concept of the invention, on the basis of example embodiments and with reference to the figures, in which.

DETAILED DESCRIPTION OF THE EXAMPLE EMBODIMENTS

Figure 1:
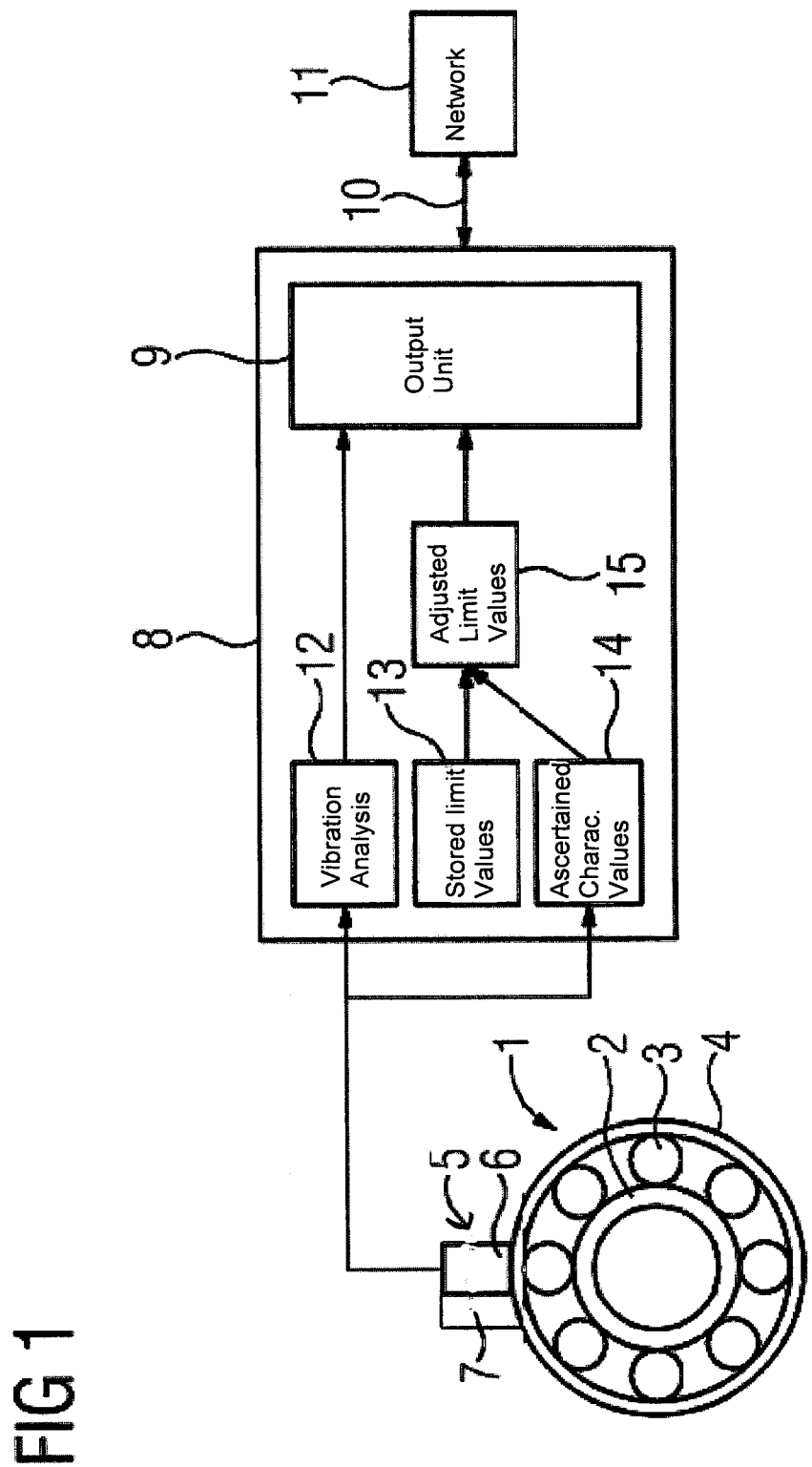
FIG. 1: is a schematic illustration of a roller bearing having the sensor systems connected to it and having a diagnosis electronics system.

The present invention will be further described in detail in conjunction with the accompanying drawings and embodiments. It should be understood that the particular embodiments described herein are only used to illustrate the present invention but not to limit the present invention.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

An apparatus and a method are disclosed. Advantageous embodiments of the invention are the subject matter of the dependent claims and will be explained in greater detail in the following description with partial reference to the figures.

An embodiment of the invention is based on an apparatus for monitoring the state of a roller bearing which has a vibration sensor, it being possible to detect vibrations which occur during operation of the bearing using said vibration sensor and it being possible to generate a first signal as a function of the detected vibrations. A diagnosis electronics system is also provided, it being possible for said diagnosis electronics system to output an item of information about a state of the bearing on the basis of the first signal, which is generated by the vibration sensor, and of at least one limit value, which is stored in the diagnosis electronics system.

According to an embodiment of the invention, an apparatus of this kind for monitoring the state of a roller bearing has been developed in such a way that, in addition to the vibration sensor, a sound emission sensor is provided, it being possible for noises which are produced in the event of plastic deformation of the bearing at least in regions to be picked up by the sound emission sensor, and that a second signal can be transmitted to the diagnosis electronics system taking into account the picked-up noises. In this connection, provision is made in a particularly preferred manner for the diagnosis electronics system to be designed in such a way that the stored limit values can be changed taking into account the received second signal and therefore an item of information about the state of the bearing is output as a function of the noises which are produced by the bearing and picked up by the sound emission sensor.

Monitoring the state of a roller bearing in accordance with an embodiment of the invention is therefore distinguished in that, in addition to a sensor for monitoring the vibration of the bearing, a sound emission sensor, that is to say a so-called acoustic emission sensor, is used. In this case, it is, in principle, irrelevant whether the sound emission method is combined with vibration monitoring in a frequency range of up to approximately 20 kHz or with a known shock pulse method in the resonance range of a vibration pick-up.

In a particular embodiment of the invention, the sound emission sensor is designed as a piezoelectric sensor or as a sensor with a micro-electro-mechanical system (MEMS). Irrespective of which sound emission sensor is used, it is advantageous when the sound emission sensor is designed in such a way that it is particularly sensitive in a frequency range in which the material which is to be monitored generates sound emission signals in the event of plastic deformation. The frequency of the noises which a bearing or a bearing material generates in the event of plastic deformation depends on the respectively used material. In this connection, a special development of the invention makes provision for the sound emission sensor used to be particularly sensitive in a frequency range of between 100 kHz and 130 kHz. If steel is used as the material of the bearing, as is often the case, the sound emission sensor should be sensitive in a frequency range of above approximately 80 kHz.

According to a further special development of an embodiment of the invention, provision is made for the diagnosis electronics system to be designed in such a way that the received second signals are classified in respect of their amplitude and/or frequency per time interval, and a characteristic value can be generated on the basis of this. It is particularly advantageous when the second signals which are received by the diagnosis electronics system are classified in respect of the number of pulses per time interval, the average amplitude of the pulses in a time interval, the sum of all the pulse amplitudes since the beginning of a measurement operation or the increase in the sum of all the pulses since the beginning of a measurement operation.

On the basis of the ascertained data, an output unit, for example a monitor, which is connected to the diagnosis electronics system outputs an indication which contains information about the state of the bearing. In this connection, it is advantageous when a so-called traffic light display is selected to display the state of the bearing. In the case of a traffic light display of this kind, a distinction is made between three, or a maximum of four, different states. The states between which a distinction is advantageously to be made are a good state (no damage), little or incipient damage, relatively severe damage to the bearing (a few millimeters) and severe or advanced damage. In the last stage, that is to say in the case of severe or advanced damage, the machine in which the correspondingly damaged bearing is operated should be turned off as soon as possible in order to prevent more severe damage. Whereas only the current state of a bearing has been taken into account in order to ascertain the state of the bearing and a traffic light indicator has been correspondingly employed up until now, it is possible, with the technical solution according to the invention, to additionally take into account the sound emission signals which are picked up by a sound emission sensor. The vibration analyses (FFT, envelope curve FFT, cepstrum, SPM, shock pulse method) which are based on the known methods for monitoring the state of roller bearings are used in this case.

It is advantageous when the magnitude of the limit values, for example of the limit value between the good state of a bearing and little or incipient damage to the bearing, is adjusted or changed taking into account the characteristic values which have been generated by evaluating the second signals, which are generated by the sound emission sensor, in the diagnosis electronics system. If sound emission pulses of this kind occur and are detected by the sound emission sensor, the limit values which were originally defined in the diagnosis electronics system are reduced since it is assumed that the state of the bearing is impaired at this moment, this increasing the probability of damage. If particularly high and/or frequent sound emission pulses occur on the bearing, the limit value in the diagnosis electronics system is reduced correspondingly more severely than in the case of infrequent damage phenomena of low amplitude.

If, in contrast, no sound emission pulses occur, the stored limit values are increased within the diagnosis electronics system since, at this time, the state of the bearing is not impaired, and therefore the risk of this leading to failure of the bearing has to be assessed as being lower.

In an advantageous embodiment of the invention, the vibration sensor, which operates in a relatively low frequency range, and the sound emission sensor (acoustic emission sensor) are arranged in a common sensor housing, preferably in the end plate of a machine, or separately in the vicinity of the bearing which is to be examined. Evaluation of the first and of the second signal in the diagnosis electronics system and also output of an item of information about the state of the bearing, in particular for driving a display with traffic light visualization, are preferably performed within one module in which the sensors are also provided.

In a very special embodiment, an item of information relating to the rotation speed of the bearing is used for monitoring vibration. The at least one rotation speed value required for this purpose is preferably transmitted to the diagnosis electronics system by means of a coupled network, for example Ethernet, Profinet, Profibus or the like. It is likewise feasible for the diagnosis electronics system or the module in which the diagnosis electronics system is integrated to transmit the information for the traffic light visualization to the outside by means of a network of this kind. Characteristic values for the diagnosis, for example in the event of an alert, can also advantageously be read out by means of a suitable network interface.

In addition to the described apparatus, the invention relates to a method. The method according to an embodiment of the invention is distinguished in that, in addition to monitoring vibrations, noises which are produced in the event of plastic deformation of the bearing at least in regions are picked up by a sound emission sensor, and in that a second signal is generated and transmitted to the diagnosis electronics system taking into account the picked-up noises.

The received second signals are preferably classified in accordance with their amplitude and/or their occurrence per time interval in the diagnosis electronics system, and at least one characteristic value is ascertained on the basis of the classification. The characteristic value is preferably used in order to match the vibration limit values which are stored in the diagnosis electronics system to the occurrence, the intensity and/or the frequency of the noises which are picked up by the sound emission sensor.

According to a special development of the method according to an embodiment of the invention, provision is made for the received second signals to be classified in the diagnosis electronics system taking into account a number of pulses per time interval, an average amplitude of the pulses per time interval, a sum of the pulse amplitudes since a start point of a measurement operation and/or an increase in the sum of the pulse amplitudes since a start point of a measurement operation, and for a characteristic value to be generated on the basis of this. The characteristic value is advantageously used again in order to vary the limit values, which are stored in the diagnosis electronics system, in accordance with the real state of the bearing.

The apparatus according to an embodiment of the invention and also the corresponding methods are also distinguished primarily in that they can be integrated into existing systems or installations using relatively simple devices. Further advantages are that common experiences and standards can be used and the limit values, which are stored in the diagnosis electronics system, are merely increased or decreased as a function of the occurrence of the sound emission pulses. Therefore, existing systems can be retrofitted with this method in a simple manner, and the statement about the actual state of the bearing is made with a relatively high degree of robustness and at a precise time. As soon as the material in the roller bearing is damaged, the current operating state of said roller bearing is classified as being more impaired than if no damage had occurred. The simplicity of the traffic light visualization is maintained in spite of the use of the method according to an embodiment of the invention. Therefore, no additional output unit, in particular no additional traffic light monitor, is required on account of the use of an additional sound emission sensor, and it is not necessary to link two traffic light signals in spite of the use of different sensor systems.

FIG. 1 shows a roller bearing 1 comprising a bearing inner ring 2, comprising rolling bodies (for example bearing balls 3), and also a bearing outer ring 4. A sensor module 5 which has both a vibration sensor 6 and also a sound emission sensor 7, a so-called acoustic emission sensor, is also provided. The sensor module 5 is connected to a diagnosis electronics system 8 to which the generated signals, which are in each case picked up by the sensor module 5 or the sensors 6, 7 which are contained therein, are forwarded.

The first signals which are generated by the vibration sensor 6 are evaluated within the diagnosis electronics system 8 with the aid of a vibration analysis 12. Information about the state of the bearing is forwarded to an output unit 9, which is designed as a traffic light monitor, on the basis of the results of the vibration analysis. Four different states of the bearing, specifically a good state (no damage), little or incipient damage, relatively severe damage to the bearing (relatively severe pitting or freely moving particles, also called chips) and severe or advanced damage can be visualized with the aid of the traffic light monitor. Visualization is performed with the aid of a maximum of four traffic light signals which are of different colors, for example green, yellow, orange, red.

If the last warning stage of the state of the bearing is reached, the machine in which the monitored bearing 1 is located should typically be decommissioned. In order to be able to make statements about the current state of the bearing on the basis of the results of the vibration analysis 12 which is carried out, corresponding limit values 13 are stored in the diagnosis electronics system 8. When a limit value 13 is reached or exceeded by the current values, the indication on the traffic light monitor 9 is correspondingly changed.

According to an embodiment of the invention, the sensor module 5 with which the roller bearing 1 is monitored has, in addition to a vibration sensor 6, a sound emission sensor 7 which picks up sound emission signals in the region of the bearing 1, which signals are produced in this region on account of plastic material deformations, and transmits signals which are based on this to the diagnosis electronics system 8. The second signals which are generated by the sound emission sensor 7 and transmitted to the diagnosis electronics system 8 are classified taking into account the number of pulses per unit time, the average amplitude of the pulses in a time interval, the sum of all the pulse amplitudes since the beginning of a measurement operation and the increase in the sum of all the pulses since the beginning of a measurement operation, and corresponding characteristic values 14 are generated. On the basis of the characteristic values 14 which are obtained in this way, the limit values 13, which are stored in the diagnosis electronics system 8, are finally varied for the purpose of monitoring vibrations, and limit values 15 which are matched to the current state of the bearing and the existing risk of further damage to the bearing are generated.

If no noises are picked up by the sound emission sensor 7 in the region of the bearing, and therefore no signals are generated either, the limit values 13 are correspondingly increased, and the adjusted limit values 15 are therefore greater in this case. If, in contrast, particularly frequent or particularly strong sound emission signals are picked up and pulses which are based on this are transmitted to the diagnosis electronics system 8, the vibration limit values 13 in the diagnosis electronics system 8 are reduced, and the limit values 15 which are adjusted in this way are therefore smaller. In this way, it is possible to take into account damage to the material in the region of the roller bearing 1 and to take this into account when classifying the operating state of the bearing 1 and the associated setting of the traffic light monitor 9.

A network interface 10 by which the diagnosis electronics system 8 is connected to a network is also provided. It is possible to use this connection to transmit further information, in particular rotation speed information or information about a dangerous state of the bearing 1 and/or of the entire installation.

Figure 2:
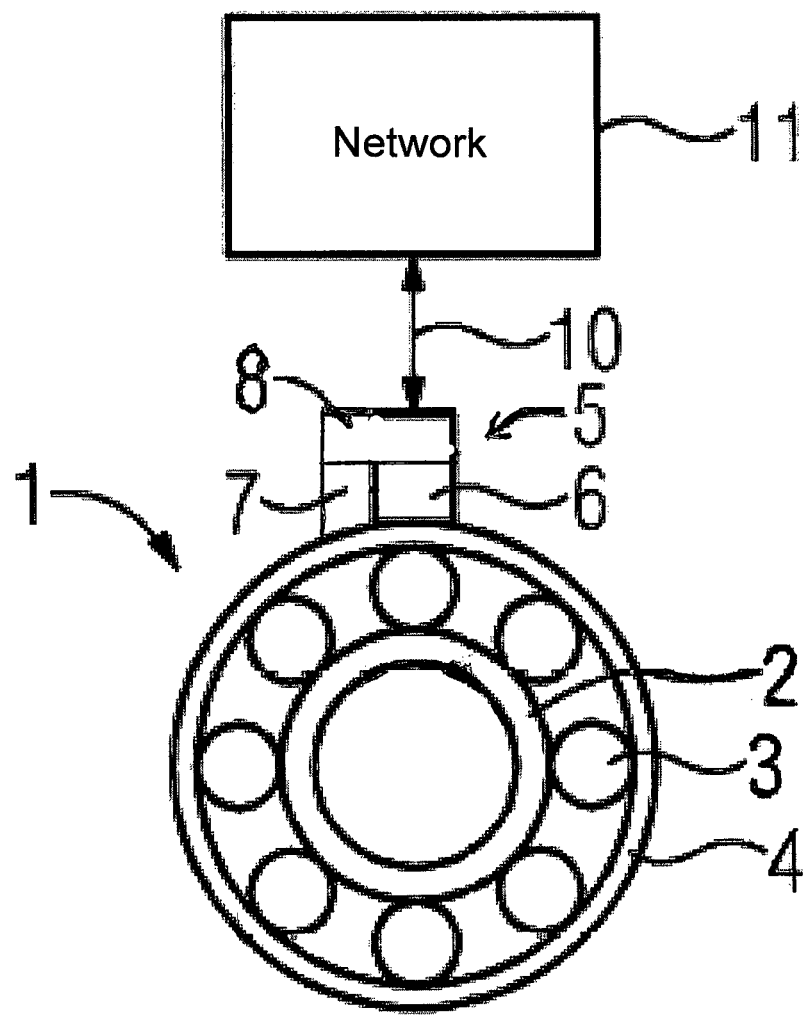
FIG. 2: is a schematic illustration of a roller bearing having a module which comprises sensor systems and a diagnosis electronics system and which is connected to a network.

FIG. 2 again shows a roller bearing 1 with the components already explained in the description of FIG. 1. A sensor module 5 is attached to the roller bearing 1. However, it is essential in the embodiment illustrated in FIG. 2 for the diagnosis electronics system 8 to be integrated in the sensor module 5 together with the vibration sensor 6 and the sound emission sensor 7 and furthermore for the module 5 to have a network interface 10. In this way, it is possible to provide the rotation speed information, which is required for monitoring vibrations when using specific methods for vibration analysis, to the sensor module 5 or to the diagnosis electronics system 8 by means of the coupled network 11. In this case, the module 5 forwards the signals for setting the traffic light monitor 9 by means of the coupled network 11. Similarly, further characteristic values which are required for the diagnosis, for example in the event of an alert, can be transmitted by way of the network interface 10 and the network 11.

Although the invention has been illustrated and described in greater detail by way of the example embodiment, the invention is not restricted by the disclosed examples and other variations can be derived therefrom by the person skilled in the art without departing from the scope of protection of the invention.

LIST OF REFERENCE SYMBOLS

1 Bearing
2 Bearing inner ring
3 Bearing ball
4 Bearing outer ring
5 Sensor module 6 Vibration sensor
7 Acoustic sensor
8 Monitoring unit
9 Output unit
10 Network interface
11 Network
12 Vibration analysis
13 Stored limit values
14 Ascertained characteristic values
15 Adjusted limit values

What is claimed is:

1. An apparatus for monitoring the state of a roller bearing comprising:
  a vibration sensor configured to detect vibrations which occur during operation of the bearing and configured to generate a first signal as a function of the detected vibrations;
  a diagnosis electronics system configured to output an item of information about a state of the bearing on the basis of the first signal, generated by the vibration sensor, and of at least one limit value, stored in the diagnosis electronics system; and
  a sound emission sensor configured to pick up noises produced in an event of plastic deformation of the bearing at least in regions, a second signal being transmittable to the diagnosis electronics system, taking the picked-up noises into account, wherein the diagnosis electronics system is designed such that the stored limit values are changeable, taking into account the received second signal, and adjusted limit values are generateable as a result.

2. The apparatus of claim 1, wherein the sound emission sensor is a piezoelectric sensor or a sensor with a micro-electro-mechanical system (MEMS).

3. The apparatus of claim 1, wherein the sound emission sensor has a sensitivity starting from a frequency of 80 kHz.

4. The apparatus of claim 3, wherein the sound emission sensor has a sensitivity in a frequency range of from 100 to 130 kHz.

5. The apparatus of claim 1, wherein the diagnosis electronics system is designed to classify the received second signals in respect of at least one of amplitude or frequency per time interval, and generate a characteristic value on the basis of the classification.

6. The apparatus of claim 1, wherein at least three different states of a bearing are ascertainable and outputtable by the diagnosis electronics system.

7. The apparatus of claim 1, wherein the sound emission sensor and the vibration sensor are formed in a common housing.

8. A method for monitoring vibration of a roller bearing, comprising:
  detecting vibrations, which occur during operation of a bearing, using a vibration sensor;
  generating a first signal as a function of the detected vibrations;
  transmitting the first signal to a diagnosis electronics system in which an item of information about a state of the bearing is ascertained and output on the basis of the first signal and at least one limit value stored in the diagnosis electronics system;
  picking up noises, produced in the event of plastic deformation of the bearing at least in regions, using a sound emission sensor; and
  generating and transmitting a second signal to the diagnosis electronics system, taking into account the picked-up noises, wherein the diagnosis electronics system is designed such that the stored limit values are changeable, taking into account the received second signal, and adjusted limit values are generateable as a result.

9. The method of claim 8, wherein the received second signals are classified in accordance with at least one of amplitude or occurrence per time interval in the diagnosis electronics system, and wherein at least one characteristic value is ascertained on the basis of the classification.

10. The method of claim 9, wherein the received second signals are classified in the diagnosis electronics system, taking into account at least one of a number of pulses per time interval, an average amplitude of the pulses per time interval, a sum of the pulse amplitudes since a start point of a measurement operation or an increase in the sum of the pulse amplitudes since a start point of a measurement operation, and wherein a characteristic value is generated on the basis of the classification.

11. The method of claim 8, wherein the received second signals are classified in the diagnosis electronics system, taking into account at least one of a number of pulses per time interval, an average amplitude of the pulses per time interval, a sum of the pulse amplitudes since a start point of a measurement operation or an increase in the sum of the pulse amplitudes since a start point of a measurement operation, and wherein a characteristic value is generated on the basis of the classification.

* * * * *